United States Patent [19]

Moiin et al.

[11] Patent Number: 5,999,712
[45] Date of Patent: Dec. 7, 1999

[54] DETERMINING CLUSTER MEMBERSHIP IN A DISTRIBUTED COMPUTER SYSTEM

[75] Inventors: Hossein Moiin, San Francisco; Ronald Widyono, Mountain View; Ramin Modiri, San Jose, all of Calif.

[73] Assignee: Sun Microsystems, Inc., Palo Alto, Calif.

[21] Appl. No.: 08/955,885

[22] Filed: Oct. 21, 1997

[51] Int. Cl.[6] .......................... G06F 13/00; H04L 12/00
[52] U.S. Cl. ............................ 395/200.5; 395/200.51; 395/200.31; 370/254
[58] Field of Search ..................... 395/200.51, 200.31; 370/254

[56] References Cited

U.S. PATENT DOCUMENTS 5,659,777  8/1997  Iwasaki et al. ................. 395/200.56
5,799,305  8/1998  Bortvedt et al. ....................... 707/10

OTHER PUBLICATIONS

Chandra, Hadzilacos, Toueg, and Charron–Bost, "On the Impossibility of Group Membership," *Proceedings of PODC 1996*.

Fischer, Lynch, and Paterson, "Impossibility of Distributed Consensus With One Faulty Process," *Journal of the ACM*, 32(2):374–382, Apr. 1985.

*Primary Examiner*—Krisna Lim
*Attorney, Agent, or Firm*—James D. Levy

[57] ABSTRACT

Cluster membership in a distributed computer system is determined by determining with which other nodes each node is in communication and distributing that connectivity information through the nodes of the system. Accordingly, each node can determine an optimized new cluster based upon the connectivity information. Specifically, each node has information regarding with which nodes the node is in communication and similar information for each other node of the system. Therefore, each node has complete information regarding interconnectivity of all nodes which are directly or indirectly connected. Each node applies optimization criteria to such connectivity information to determine an optimal new cluster. Data represent the optimal new cluster is broadcast by each node. In addition, the optimal new cluster determined by the various nodes are collected by each node. Thus, each node has data representing the proposed new cluster which is perceived by each respective node to be optimal. Each node uses such data to elect a new cluster from the various proposed new clusters. For example, the new cluster represented by more proposed new clusters than any other is elected as the new cluster. Since each node receives the same proposed new clusters from the potential member nodes of the new cluster, the new cluster membership is reached unanimously. In addition, since each node has more complete information regarding the potential member nodes of the new cluster, the resulting new cluster consistently has a relatively optimal configuration.

1 Claim, 2 Drawing Sheets

DETERMINING CLUSTER MEMBERSHIP IN A DISTRIBUTED COMPUTER SYSTEM

FIELD OF THE INVENTION

The present invention relates to fault tolerance in distributed computer systems and, in particular, to a particularly robust mechanism for determining which nodes in a failing distributed computer system form a cluster and have access to shared resources.

BACKGROUND OF THE INVENTION

The problems associated with providing membership services in a distributed computer system have generated a considerable amount of interest in both academic and industrial fronts. The Parallel Database (PDB) system available from Sun Microsystems, Inc. of Palo Alto, Calif., being a distributed system, has used the cluster membership monitor to provide mechanisms to keep track of the member nodes and to coordinate the reconfiguration of the cluster applications and services when the cluster membership changes. Herein, we define the general problem of membership in a cluster of computers where the nodes of the cluster may not be fully connected and we propose a solution to it.

The general problem of membership can be encapsulated by the design goals for the membership algorithm that are outlined below. We will further describe the problems that we are trying to address after we state these goals.

1. A uniform and robust membership algorithm regardless of the system architecture that is able to tolerate consecutive failures of nodes, links, storage devices or the communication medium. Stated in other words, no single point of failure should result in cluster unavailability.
2. Data integrity is never jeopardized even in the presence of multiple and simultaneous faults. This is accomplished by:
   (a) Having only one cluster with majority quorum operational at any given time.
   (b) The cluster with majority quorum should never reach inconsistent agreement.
   (c) Removal of isolated and faulty nodes from the cluster in a bounded time.
   (d) Timely fencing of non-member nodes from the shared resources.

The hardware architecture of some conventional distributed computer systems poses specific problems for the membership algorithm. For example, consider the configuration shown in FIG. 1. In this figure each of nodes 100A–D is supposed to be connected to two switches 101–102; however, there are two link failures that effectively disallow nodes 100A and 100D from communicating with each other. Some conventional membership algorithms are not capable of dealing with such a failure and will not reach an agreement on a surviving majority quorum. Those algorithms assume that the nodes are fully connected and do not deal with the problem of a partitioned network. What is needed is a generalized algorithm that deals with the issue of a partitioned network as well as networks that are not partitioned.

Further complications arise when we need to make decisions about split-brain, or possible split-brain situations. For example, consider the configuration shown in FIG. 2. In this configuration if the communication between nodes {200A, 200B} and {200C, 200D} is lost so that there are two sub-clusters with equal number of nodes, then the current quorum algorithm may lead to the possible shut-down of the entire cluster. Other situations during which the current algorithm is not capable of dealing with include when there are two nodes in the system and they do not share an external device.

The above examples illustrate a new set of problems for the membership and quorum algorithms that were not possible under the more simplistic architecture of some conventional distributed computer systems where a fully connected network was assumed. Our approach to solving these new problems is to integrate the membership and quorum algorithms more closely and to provide a flexible algorithm that would maximize the cluster availability and performance as viewed by the user.

A further impact of the configuration of external devices is the issue of failure fencing. In a clustered system the shared resources (often disks) are fenced against intervention from nodes that are not part of the cluster. In some distributed computer systems, the issue of fencing was simple due to the fact that only two nodes existed in a cluster and they were connected to all the shared resources. The node that remained in the cluster would reserve all the shared resources and would disallow the non-member node from accessing these resources until that node became part of the cluster. Such a simple operation is not possible for an architecture in which all disks are not connected to all nodes. Given that the SPARC Storage Arrays (SSA's) are only dual ported, there needs to be a new way that would effectively fence a non-member node out of the shared resources.

The Cluster Membership Monitor, CMM, which is responsible for the membership, quorum and failure fencing algorithms, handles state transitions which lead to changes in the membership. These transitions are listed below.

Failure of a Node: When a node fails, the remaining nodes will initiate a cluster reconfiguration resulting in a membership that will not include the failed node.

Joining of a Node: A node can join a cluster after the node is restarted and after other members of the cluster accepted it as a new member, following a reconfiguration.

Voluntary Leave: A node can leave the cluster voluntarily, and the remaining members of the cluster will reconfigure into the next generation of the cluster.

Communication Failures: The cluster membership monitor handles communication failures that isolate one or more nodes from those nodes with a majority quorum. Note that the detection of the communication failure, i.e. detecting that the communication graph is not fully connected, is the responsibility of the communication monitor which is not part of the membership monitor. It is assumed that the communication monitor will notify the membership monitor of communication failures and that the membership monitor will handle this via a reconfiguration.

It is also important to note that the CMM does not guarantee the health of the overall system or that the applications are present on any given node. The only guarantees made by the CMM is that the system's hardware is up and running and that the operating system is present and functioning.

We would like to explicitly define what failures are considered in the design of the system. There are three failures that we consider; node failures, communication failures, and device failures. Note that the failures of the client nodes, terminal concentrators, and the administration workstation are not considered to be failures within "our" system.

Node Failures: A node is considered to have failed when it stops sending its periodic heart-beat messages (SCI or CMM) to other members of the cluster. Furthermore, nodes are considered to behave in a non-malicious fashion, a node that is considered failed by the system will not try to intentionally send conflicting information to other members of the cluster. It is possible for nodes to fail intermittently, as in the case of a temporary deadlock, or to be viewed as failed by only part of the remaining system, as in the case of a failed adaptor or switch. The cluster membership monitor should be able to handle all these cases and should remove failed nodes from the system within a bounded time.

Communication Failures: The private communication medium may fail due to a failure of a switch, a failure of an adaptor card, a failure of the cable, o failure of various software layers. These failures are masked by the cluster communication monitor (CCM or CIS) so that the cluster membership monitor does not have to deal with the specific failure. In addition, the cluster membership monitor will either send its messages through all available links of the medium. Hence, failure of any individual link does not affect the correct operation of the CMM and the only communication failure affecting CMM is the total loss of communication with a member node. This is equivalent to a node failure as there are no physical paths to send a heartbeat message over the private communication medium. It is important to note that in a switched architecture, such as in the 2.0 release of Energizer, the failure of all switches is logically equivalent to the simultaneous failure of n−1 nodes where n is the number of nodes in the system.

Device Failures: Devices that affect the operation of the cluster membership monitor are the quorum devices. Traditionally these have been disk controllers on the Sparc Storage Arrays (SSA's), however, in some distributed computer systems, a disk can also be used as a quorum device. Note that the failure of the quorum device is equivalent to the failure of a node and that the CMM in some conventional systems will not use a quorum device unless it is running on a two node cluster.

Some distributed computer systems are specified to have no single point of failures. Therefore, the system must tolerate the failure of a single node as well as consecutive failures of n−1 nodes of the system. Given the above discussion on communication failures, this specification implies that we cannot tolerate the total loss of the communication medium in such a system. While it may not be possible, or desirable, to tolerate a total loss of the private communication medium, it should be possible to tolerate more than a single failure at any given time. First, let us define what a cluster is and how various failures affect it.

A cluster is defined as having N nodes, a private communication medium, and a quorum mechanism, where the total failure of the private communication medium is equivalent to the failure of N−1 nodes and the failure of the quorum mechanism is equivalent to the failure of one node.

Now we can make the following fault-tolerance goal for the cluster membership monitor;

A cluster with N nodes, where $N \geq 3$, a private communication medium, and a quorum mechanism, should be able to provide services and access to the data, however partial, in the case of $\lceil N/2 \rceil - 1$ node failures. For a two node cluster the cluster can tolerate only one of the following failures:

Loss of one of its nodes.

Loss of the private communication medium. Note that this case is logically equivalent to the loss of one node.

Loss of the quorum device.

Loss of one of its nodes and the communication medium. Note that this case is logically equivalent to the loss of one node.

Note that the total loss of the communication medium in a system with more than 2 nodes is indeed a double failure (as both switches would have to be non-operational) and the system is not required to tolerate such a failure.

SUMMARY OF THE INVENTION

In accordance with the present invention, cluster membership in a distributed computer system is determined by determining with which other nodes each node is in communication and distributing that connectivity information through the nodes of the system. Accordingly, each node can determine an optimized new cluster based upon the connectivity information. Specifically, each node has information regarding with which nodes the node is in communication and similar information for each other node of the system. Therefore, each node has complete information regarding interconnectivity of all nodes which are directly or indirectly connected.

Each node applies optimization criteria to such connectivity information to determine an optimal new cluster. Data representing the optimal new cluster is broadcast by each node. In addition, the optimal new cluster determined by the various nodes are collected by each node. Thus, each node has data representing the proposed new cluster which is perceived by each respective node to be optimal. Each node uses such data to elect a new cluster from the various proposed new clusters. For example, the new cluster represented by more proposed new clusters than any other is elected as the new cluster. Since each node receives the same proposed new clusters from the potential member nodes of the new cluster, the new cluster membership is reached unanimously. In addition, since each node has more complete information regarding the potential member nodes of the new cluster, the resulting new cluster consistently has a relatively optimal configuration.

DETAILED DESCRIPTION

Figure 1:
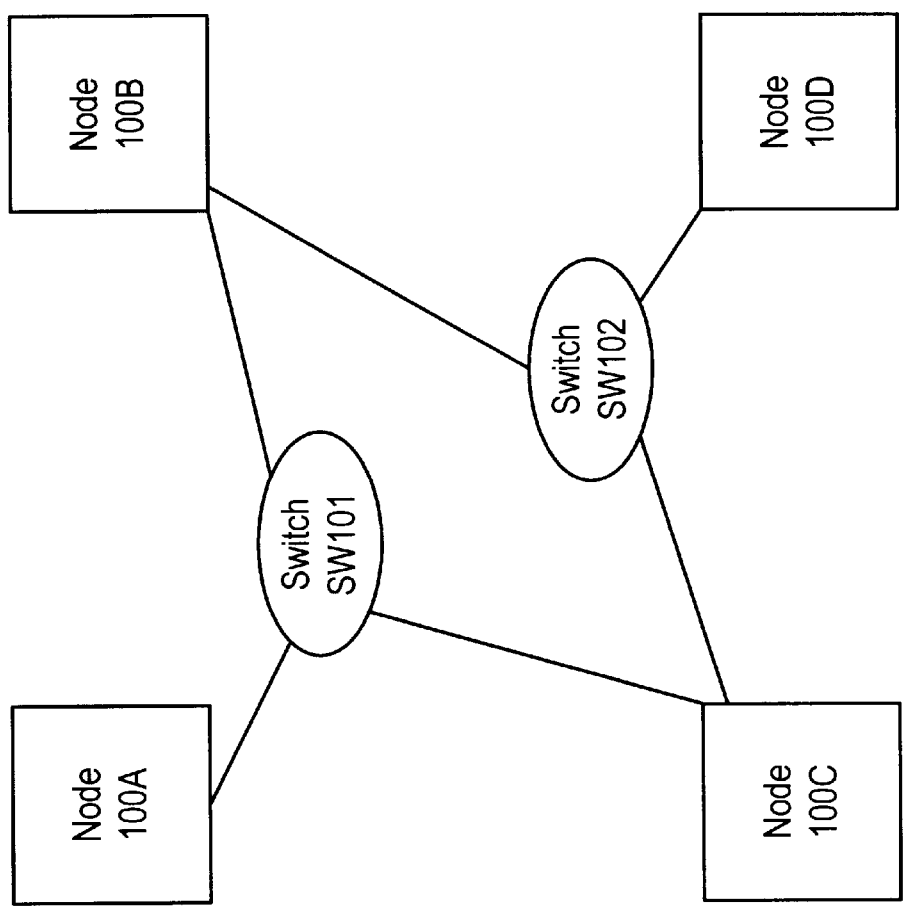
FIG. 1 is a block diagram of a distributed computer system in which communications between two nodes and two respective switches have failed.
Figure 2:
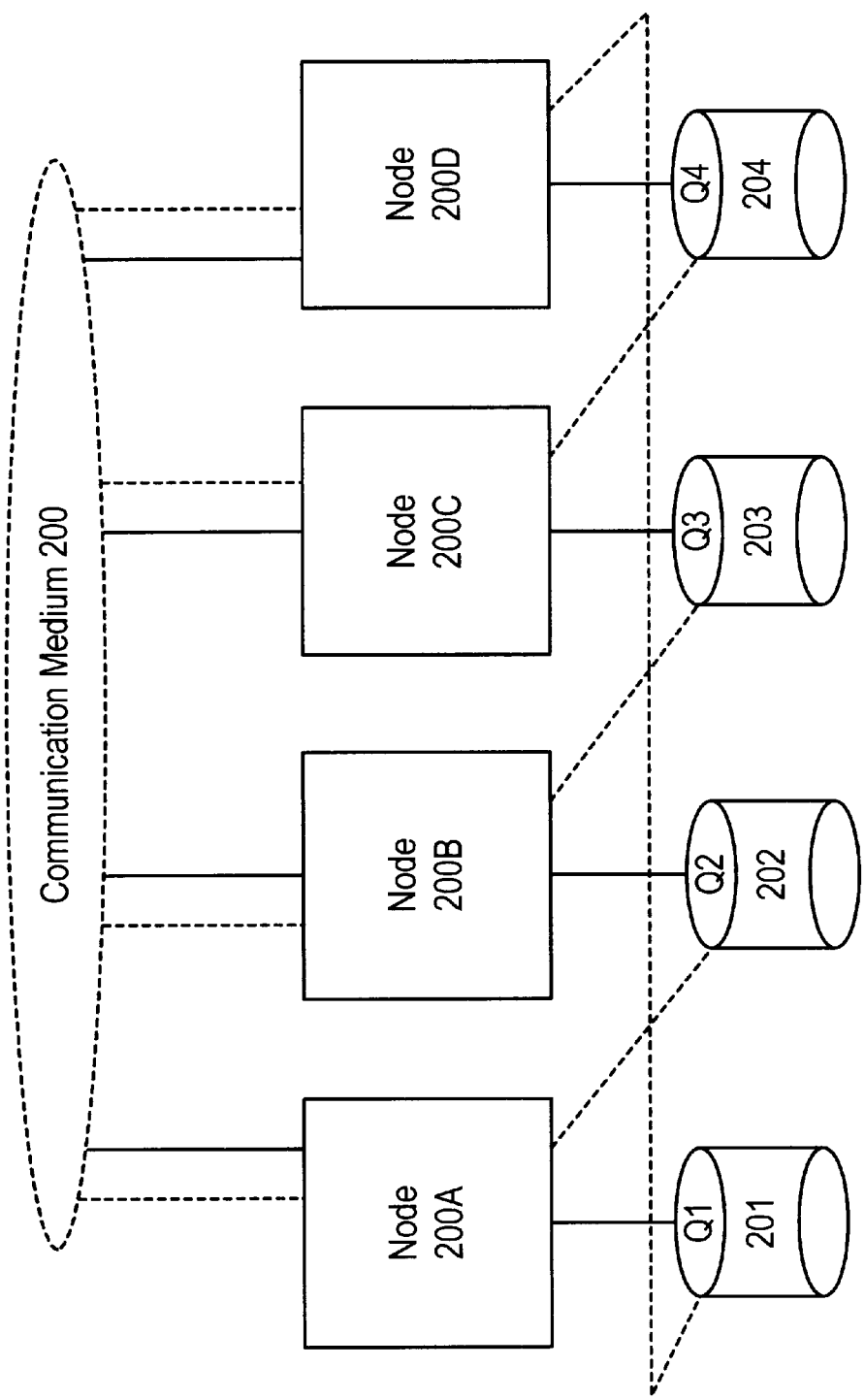
FIG. 2 is a block diagram of a distributed computer system which includes dual-ported devices.

Agreement among the processors of a distributed system on which processors are members of that system is a fundamental problem in the design of highly-available distributed systems. Changes in membership may occur when processors are shut down, fail, recover, or new processors are added. Currently, there is no agreed definition of the processor membership problem and the existing membership protocols provide significantly different guarantees about their services. The protocols we are interested in lie toward the stricter end of the spectrum, ensuring that processor in the current membership agree on the set of member nodes and that membership changes occur at logically equivalent times in different nodes.

With the failures described above, the cluster membership can be partitioned into two or more fully-connected subsets of nodes having a majority of the votes, a minority of the votes, or exactly half of the votes. The first two cases may be resolved by only allowing a subset having a majority vote to form the next generation of the cluster. In the latter case, a tie breaking mechanism must be employed. Some cluster membership algorithms take advantage of the restrictions imposed by a two node architecture in resolving these issues. To generalize for architectures involving more than two nodes, the following new issues are resolved by the algorithm according to the present invention.

1. Resolving quorum and membership when not all pairs of nodes share a common external device.

Integration of quorum and membership algorithms is sometimes necessary for systems with more than two nodes and would result in some modifications in the membership algorithm. There is really no need for an external device to resolve membership and quorum issues if there are more than 2 nodes in a distributed system. However, a system with only two nodes needs an external quorum mechanism.

In some distributed computer systems, this external device is a disk or a controller that resides on the SSA's. The choice of a quorum device, particularly for a disk, has some unfavorable properties which adversely affect the overall availability of the cluster.

The situation for a 4 node system with an architecture that does not allow all nodes to be connected to all external devices can be more complicated. In such an architecture, some combination of nodes that can form a cluster do not share any external devices, other than the communication medium, and therefore if we are to allow for such clusters to exist, we would need an alternative quorum mechanism. Given that the use of the public network is a serious security hole, we are left with the last resort, i.e. the human intervention. We sometimes use this resort as described more completely below for cases in which a winner by the majority of votes cannot be automatically determined and explain a new user interface in greater detail below.

2. Allowing for a majority quorum requirement that adapts to changing memberships.

With more than two configured nodes, requiring more than half the total configured votes for majority quorum would limit the flexibility for the user. In a four node system, not even two nodes could form a cluster. The modified algorithm bases the quorum requirement on the votes of the current membership and of any joining nodes.

3. Treating the "voluntary leave" of a cluster member as a hint that the majority quorum requirement may be lowered.

The original algorithm considers the explicit simultaneous cluster shutdown of more than half the nodes to be equivalent to a partition excluding those nodes. To avoid the resulting loss of quorum and the complete cluster shutdown, the new algorithm uses the notification of an explicit shutdown by a node to reduce the quorum requirement.

4. Dealing with joins when the nodes are partitioned.

With a two node configuration and a tie-breaking quorum device, it is not possible for the two nodes to form independent clusters when communication between them is broken. With more than two nodes and the dynamic quorum requirement modification in item 2, such an inconsistent state (two or more independent clusters) is possible, since all fully connected subsets of nodes can form a cluster with quorum. The algorithm according to the present invention differentiates between initial creation of the cluster and subsequent joins. Except for this initial join, joins cannot independently form a cluster-a node can only join an existing cluster. The user interface for this is discussed below.

5. Handling failures that occur during the membership algorithm.

With a dynamic quorum requirement, inconsistencies among nodes in the number of votes required for quorum can occur when failures happen during a reconfiguration. To avoid the possibility of two or more subsets having quorum and forming independent clusters, the modified algorithm imposes a restriction on joiners-joiners may only join a fully intact existing cluster. Note that this requires all nodes participating in the membership algorithm to agree on the membership of the existing cluster.

6. Dealing with the partial connectivity situation depicted in FIG. 1.

In such a scenario, the original algorithm does not reach an agreement. The algorithm would converge when a set of nodes agree on the same membership proposal, but this condition is never satisfied. In the algorithm according to the present invention, when this condition is suspected (using a timeout), some nodes modify their membership proposal to a subset that is maximally connected.

In the following subsections, we discuss the format of the messages that cluster daemons exchange, define what an optimal membership set is and how to select one, specify the assumptions made in the membership algorithm in addition to those made above, describe how a change in membership may come about, describe the membership algorithm, explain how CMM can suspend and resume a set of registered processes, discuss how CMM checks for consistency of its configuration database, and specify some new user interfaces that may be needed.

4.1 CMM Messages

The membership monitors on different nodes of a cluster exchange messages with each other to notify that they are alive, i.e. exchange heart-beats, and to initiate a cluster reconfiguration. While it is possible to distinguish between these two types of messages, in practice they are the same message and we refer to them as RECONF_msg messages to stress that they cause reconfiguration on the receiving nodes.

Each RECONF_msg will include the following fields:

A sequence number, seq_num, that distinguishes between different reconfigurations.

A vector, $M_p$ that contains node i's membership vote.

A vector $S_i$ that contains node i's view of the most recent stable membership.

A vector, $V_D$ that contains the connectivity information of node i.

A vector SD, that contains node i's view of nodes that have voluntarily left the cluster as of the time the most recent stable membership was established.

The state of the node $St_i$.

The node id of the originating node.

A vector $J_D$ that contains node i's view of nodes that are attempting to join.

A flag indicating whether the originating node considers itself a joining node.

4.2 Definitions and Assumptions

The membership algorithm assumes that the cluster is made up of equally valuable nodes, i.e. that the cluster is a homogeneous cluster. The membership algorithm is based on a set of rules that are stated in the following precedence order and are used to develop the membership algorithm:

1. A node must include itself in its proposed set.
2. A node will vote for nodes that are already in the cluster over the ones that are trying to join it.
3. A node will propose a set that includes itself and has the maximum number of fully connected nodes.

4. All nodes agree on a statically defined preference order among nodes, e.g. lower numbered nodes are preferred to higher numbered ones.

The above set of rules define a hierarchy of rules with the statically defined preference being at the bottom of such a hierarchy. Note that at the above set of rules also defines an optimal membership set, ^.

To find the optimal membership set, ^, in a cluster with one or more failures is a computationally expensive task. This problem can be stated in terms of selecting the optimal, according to the definition of optimality derived from the above rules, subset of a set of nodes. Assuming that the cluster is composed of N nodes, finding ^ is equivalent to finding an optimal matrix of size M×M from a matrix of size N×N, where M<N. This problem is indeed the well known problem of "N choose M" which is also known as binomial coefficients. The solution to this problem is of $O(2^N)$ complexity if we assume that the system is homogeneous so that each node can be represented by either 0, 1 or −1. While the cost of finding an optimal subset is prohibitively high for large N; for N<20 this cost is not prohibitive. Therefore, for systems with 16 or less nodes, we propose to find the optimal set via an exhaustive search method. For systems with more than 20, nodes a heuristic algorithm that will approximate the optimal solution is preferred. An assumption that we make is that when a node that aborts broadcasts a RECONF_msg to all other members of the current cluster. We also assume that a node that wants to join the cluster does so in its begin state and its sequence number is reset to 0. We also assume that only messages with higher or equal sequence numbers to a node's own sequence number are processed and a state that is at most one behind in ordinal value. However, there is a significant exception. If the message comes from a node with the 'joiner' flag set, it will be processed even if the state is stale (more than one behind). These are the nodes that are trying to join the cluster and we must accept their initial messages. All these assumptions are enforced by our implementation of the member ship algorithm according to the present invention.

4.3 Changes in the Membership

There are a number of ways in which a node can get into a reconfiguration which may result in a change in the membership according to the algorithm presented in the next subsection. The following is a list of them:

1. Joins: This is when nodes either form a new cluster or join an already existing one.
   (a) First Join: This is done only for the first node of a cluster and is implemented via a new command, pdbadmin startcluster, which signals to the CMM running at that node that it should not expect to hear from other members of the cluster, as there are not any. This command can only be issued once in the beginning of the life of a cluster, where the life of a cluster is defined as the time that spans from the moment that the pdbadmin startcluster is issued to the time where the cluster returns to having no members. If additional pdbadmin startcluster commands are issued they may cause, at worst the system to compromise data integrity if the node is isolated or, in more realistic cases, generate errors and abort the node for which this command was mistakenly issued.
   (b) Joins Following the First Join: These joins are done via the common pdbadmin startnode command and result in one node, or a set of nodes, to join the cluster. The nodes that are trying to join the cluster will communicate with the nodes that are already members of the cluster and try to see if they can join by going through the membership algorithm.

2. Leaves: This is when nodes that were members of the cluster leave the cluster either voluntarily or involuntarily.
   (a) Voluntarily Leaves: The operator issues a pdbadmin stopnode command to a node, or a set of nodes. This will cause the affected nodes to go through the stop sequence which would result in the node sending a message to all other nodes in the cluster informing of them that it is leaving the cluster. This information can be used, and is used, by the membership algorithm to optimize certain aspects of the membership.
   (b) Involuntarily Leaves: There are two distinct cases for involuntarily leaves:
      i. The node can complete its abort or stop sequences and can "clean-up" after itself More importantly, as far as CMM is concerned, the node can send a message, the same one as the voluntarily leaves, that would inform other members of the cluster that this node will not be part of the cluster. The same optimizations that can be performed for the voluntarily leaving of a node can actually be implemented here. A node may leave the cluster due to a request from an application program with the appropriate privileges.
      ii. The node does not complete its abort sequence and panics the system. This is the most difficult of all failures to deal with and is usually detected by the absence of a heart-beat message from the failed node. This failure is un-distinguishable from a network failure in an asynchronous distributed system.

4.4 The Algorithm

The membership algorithm is described in this subsection. It relies on the assumptions and definitions described above. The user interface used in this algorithm is described later to make the flow of the algorithm "clean". Before we proceed to the description of the algorithm, we state the following rules that are enforced by our implementation of the membership algorithm;

Each node, whether already part of the cluster or trying to join the cluster gets one and only one vote.

Each node, i will update its connectivity slate matrix, $C_i$, as soon as it hears from a node. The matrix $C_i$ is node i's understanding of the overall connectivity of the system. If node i does not hear from a node j within the specified time, or is informed that node j is down or unreachable, it will mark the $e_{ij}$ element of $C_i$ as zero. Furthermore, it will mark all the elements of the jth row as NULL, which implies that node i does not have any information about the connectivity of node j. For other rows of the matrix, node i will update them by replacing the kth row of its connectivity matrix with the connectivity vector $V_k$ that it receives from node k.

Each node i will initially include its ith row of $C_i$ in its RECONF_msg as the proposed membership set, $M_i^{prop}$, that it is voting for. Note that the set $M_i^{prop}$ proposed by node i is different from the vector $V_i$. $M_i^{prop}$ is a proposed set that states a node's vote for other nodes in a binary form, whereas $V_i$ is a stale vector which deals with the connectivity of the nodes in the system. Note that $M_i^{prop}$ will have different elements, each element being a node id and a binary vote value, than $V_i$, when nodes cannot agree on a stable membership and a subset of $V_i$ needs to be proposed as the new membership set.

Each node i keeps the total number of the nodes that are in its current view of the cluster membership, whether agreed or proposed, in a local variable $N_i$. Note that $N_i$ is subject to the following rules during the execution of the membership algorithm:

(a) $N_i$ is initialized to the cardinality of $^{m_i prop}$.

(b) $N_i$ is incremented for each node that is trying to join the cluster. (One increment per node as enforced via the nodeid check which is embedded in the message, done by the receiver thread.)

(c) $N_i$ is decremented for each node that aborts, as defined in part 2(b)i of Section 4.3, or voluntarily leaves. (Done by the receiver thread.)

(d) The quorum at the end of the membership algorithm is decided on this notion of $N_i$.

At the termination of the membership algorithm the nodes that form the cluster agree on the new set of member nodes, $^{M_i agreed}$. The new set will be used in the next run through the membership algorithm, and at that time, all nodes that were part of the previous configuration are assumed to have a consistent $^{M_i agreed}$ set.

Each node, i, prior to entering the membership algorithm will have a sequence number, $seq_{13}$ num, that is the same for all nodes in the current cluster. In addition each node will have its connectivity state matrix, $C_i$. Note that $C_i$ is a n×n matrix, where n is the maximum number of nodes as defined by the current cluster configuration file, i.e. the current cdb file.

Each node that is a joiner will have a variable, joining_node, set to TRUE. Once a node has become a member of $^{M_i agreed}$, it is no longer a joiner, and joining_node is set to FALSE.

A node that is executing the first join will have a variable, start_cluster, set to TRUE. Nodes that are trying to join the cluster will have their start_cluster variable initialized to FALSE.

All nodes of the cluster get their information about the various timeout values from the configuration file. Notations $T_1, T_2, \ldots$ is used to denote possibly different timeout values. All these values need to be consistent among all nodes and are set to reasonable values which incorporate communication and queuing delays.

The algorithm can be described by the following for each node, i:

```
membership_algorithm( ) {
        seq_num=seq_num+1;
        /*Broadcast a RECONF_msg to all nodes proposing the set       */
        /* M_i^prop based on the initial connectivity
        matrix C_i^init          */
        /*If a node is joining, its M_i^prop will contain only NULL elements. */
        /* If the proposal does not include all of M_i^agreed and is not a
        joiner,          */
        /* then all joiners are removed from the proposal             */
        M_i^prop = membership_proposal( );
        /*then all joiners are removed from the proposal.                    */
Retry:
        While(!stable_proposal( ) && time < T_1) {
                /*Node i updates C_i, N_i and broadcast a RECONF_msg   */
                /*to all nodes in its V_i as soon as i gets and        */
                /*processes a new valid message. If message is from a node */
                /*that has not changed state and that i already has heard  */
                /*from, i will not update C_i and N_i                  */
                M_i^prop = membership_proposal( );
        }
        /*Nodes were unable to agree on a membership set. Therefore, i  */
        /*possible to reach. A new optimal subset will be proposed and  */
        /*broadcasted.                                                  */
        propose_new membership( );
        While (!stable_proposal( )) {
                /*Node i will update C_i and N_i for any valid message and*/
                /*will broadcast its RECONF_msg. If a valid message    */
                /*indicates that some node has changed state, the variable
                       */
                /*node_state_changed is set to TRUE.
                       */
                if(node_state_changed)
                        goto Retry;
        }
        /*If this is not the first join, we can check for quorum       */
        if(!start_cluster) {
        /*A joiner may not join a partially connected or nonexistent   */
                abort_node( );
        /*Check to see if the proposed set has enough votes. Let v     */
                /*represent the number of votes that the current proposal has. */
                if(v<⌊(N_i+1)/2⌋)
                        abort_node ( );
                else if(v × 2=N_i) {
                        /* This is a possible split brain situation. */
                        if (N_i = 2 && share_quorum_dev( )) {
                                if(!reserve_quorum( ))
                                abort_node( );
                        }
                        else
                                wait_for_user_input( );
                }
        }
        /*A new membership has been agreed to.                         */
```

-continued

```
        joining_node = FALSE;
        /*Node i will broadcast another RECONF_msg which will    */
        /*serve as a death message for all nodes that might have  */
        /*been stuck in a previous step of the membership         */
        /*algorithm.                                              */
}
/*A variety of conditions must pass before i's proposal is considered  */
/*stable and an agreement has been reached.                             */
boolean stable_proposal( ) {
            return FALSE
        /*Any state in C_i is NULL     */
        if(∀(s∈C_i); s≠NULL)
            return FALSE
        /* M_i^prop is not still valid   */
            return FLASE
        /* All other nodes have not caught up to the local state yet   */
        if(∀(j∈M_i^prop), ST_j ≠ ST_i)
            return FLASE
        /*The proposals do not match   */
            return FALSE
        return TRUE
}
propose_new_membership( ) {
        vector proposal_to_test = M_i^prop;
            fully_connected {
*/exclude joiners*/
find_optimal_proposal(proposal_to_test)
        else
            if(joining_node) {
            else
                */exclude joiners from proposal*/
                find_optimal_proposal(proposal_to_test&!J_i);
            }
        }
}
find_optimal_proposal(test_proposal) {
while(!fully_connected(test_proposal))
            test_proposal=get_next_proposal(test_proposal)
        } if(v < [N_i1/2])

abort_node( )
}
get_next_roposal(original) {
        /*    This routine follows rules 3 & 4 in Section 4.2 to select   */
        /* cluster proposals in order of decreasing optimality, based on the */
        /* orginal set (original) from which we are selecting.            */
        /*We exhaustively cycle through all combinations of nodes in      */
        /*decreasing order of number of nodes. The combinations are       */
        /*ordered with lower node ids having precedence over higher       */
        /*node ids.                                                       */
```

Note that in the above algorithm we assume that there is a way to send messages to all nodes that are part of the cluster. If a node is down or unreachable, this is assumed to have been dealt with in previous reconfigurations and reflected in the matrix $C_i^{init}$. Note that the concept of a valid message was discussed above. Furthermore, the new optimal subset in the above algorithm is selected according to the rules and definitions described above. Also note that the entire algorithm is being executed within the begin step of the reconfiguration which is a timed event with its own timeout value.

In the above algorithm, the function membership_proposal() returns a membership proposal based on $C_i$, including all nodes that are not in the DOWN state. It also excludes all joiners from the proposal if the proposal does not include all of $M_i^{agreed}$. An important function is the stable_proposal() function. This function decides if the proposed set $M_i^{prop}$ is agreed upon by all the members of that set. In order to count the number of votes, node i needs to compare the proposed set from other nodes, i.e. $M_j^{prop}$, j≠i with its own $M_i^{prop}$. Note that the function share_quorum_dev() is implemented by using the CCD dynamic file and informs the membership algorithm of the cases, such as a two node cluster, in which two nodes do share a quorum device. The binary function reserve_quorum() returns false if and only if the device is already reserved by another node. The function wait_for_user_input() is discussed in greater detail below.

The function propose_new_membership() will get called to find an optimal subset of $M_i^{prop}$, according to optimality conditions described above. It exhaustively tests the subset combinations of $M_i^{prop}$ until the first fully-connected set is found. The fully_connected(prop) function returns true if the candidate proposal prop is contained in all the proposal will not change. Also note that $M_i^{prop}$ is not fully-connected, no joiners will be in the proposal. Finally, the find_optimal_proposal() and get_next_proposal() functions implement the exhaustive search.

4.5 User Interfaces

Above, we deferred the discussion of how we will break the tie with the user input if there is a potential split-brain situation. In this subsection we specify how this is to be implemented.

The situations in which a set of nodes, X, and a different set of nodes, Y both have exactly N/2 votes, where N is the number of nodes in the previous cluster, is the case for which we will need operators assistant. Note that if the cardinality of both X and Y is one and they do share a quorum device, then we do not need to solicit input from the operator. In both situations the node will be waiting for the user input by executing the wait_for_user_input() call in the membership algorithm. The call to wait_for_user_input() will cause the creation of a print thread that would continuously print a message informing the operator that he needs to break the potential tie. The message would identify, for the appropriate nodes, the sets X or Y that must be shut down or informed to stay up. The operator will break the tie by issuing the command pdbadmin stopnode to one set of nodes while issuing the new command pdbadmin continue to the other set. The set that receives the stop command will abort, while the other set will stop printing the messages and continue its reconfiguration. Alternatively, the operator can issue a clustm reconfigure command, which is a valid option if there was a communication break down and the operator has fixed it. Issuing a clustm reconfigure command will cause a new reconfiguration to take place. If the operator issues any other command, besides pdbadmin stopnode, clustm reconfigure or pdbadmin continue at this time, the command reader thread, will not signal the transitions thread that is waiting for one of those commands and will simply ignore the command. The print thread, meanwhile, will be printing these messages continuously once every few seconds, to inform the operator that some immediate action is required.

The function wait_for_user_input(), which is executed by the transitions thread, is implemented as follows:

```
wait_for_user_input( )
{
    /* create the print thread and make it print */
    /* an informative message every few seconds. */
    cond_wait(&state_change_cv, &autm_lock);
    check_stop_abort( );
    /* remove the print thread. */
}
```

The above sequence of actions will cause the transitions thread to sleep on the condition variable state_change_cv which is flagged under the following conditions:

User issues a continue command.
User issues a stopnode command.
User issues an abort command.
User forces reconfiguration.
Node receives a message that indicates that a remote node in its current membership set has gone down.
Node has not received a message from a remote node in its current membership set for node_down_timeout.

All of these actions are suitable for flagging the transitions thread and allow the user to issue the right set of commands to ensure that only one primary group remains in operation in the cluster.

5 Failure Fencing and Resource Migration

Another component of the system that requires modification due to the new architecture is the failure fencing mechanism that is employed in some distributed computer systems. In this section, we discuss a solution to the general problem of resource migration and the specific problem of failure fencing. The solution provided is generic in the sense that it handles the various array topologies-cascaded, n+1, cross-connected, and others-as well as different software configurations-CVM with Netdisk, stand alone VxVM, or others. It also handles the 2-node cross connected array configuration without treating it as a special case.

The assumptions and the general solution are discussed next. This is followed by a short note on how this also solves the resource migration problem—the migration of highly available disk groups, HA/NFS file systems, logical IP addresses on the public networks. etc.

5.1 Assumptions

In the case of a shared disk configuration with CVM and Netdisk, it is assumed that the master and its backup node for all NetDisk devices have direct physical access to the underlying physical device.

In the case of a shared nothing configuration with VxVM, it is assumed that each node that has primary ownership of a set of disk groups has direct physical access to the devices belonging to those disk groups. In more concrete terms, if Node N has primary ownership of a set of disk-groups G, all disks belonging to the disk groups in G can be found in the set of storage devices denoted by D that are connected to N.

We also assume that information about the primary and backup ownership of a NetDisk device or other resources is maintained in the Cluster Configuration Database, CCD, and is available to all nodes in a consistent manner. We enforce this assumption by using the dynamic portion of the CCD. In particular, it is important that the CCD can be queried to obtain this information when the steps for failure fencing and resource migration gets executed during the reconfiguration process as outlined in the next subsection. These steps are executed only after cluster membership has been determined and quorum has been obtained.

5.2 Failure Fencing In some distributed computer systems, every node has a backup node. A node (primary) and its backup node share a set of common devices they are connected to. This is denoted by $B(N_i)=N_j$. In the case of a CVM plus Netdisk configuration, the backup node becomes the master of the set of NetDisk devices owned by a failed node. In the case of VxVM configuration, the backup node becomes the primary owner of the set of disk group resources owned by a failed node.

Let $N_i$ denote a node of a cluster and $D_i$ denote a set of storage devices (composed of one or more SSA and/or Multipacks). Assuming that there are four nodes in the cluster, $N_1$ to $N_4$, we will have the following relations for a cascaded configuration: $B(N_1)=N_4$, $B(N_2)=N_1$, $B(N_3)=N_2$, $B(N_4)=N_3$. For the n+1 configuration the relation is given by: $B(N_1)=N_4$, $B(N_2)=N_4$, $B(N_3)=N_4$. Note that in this case node $N_4$ does not have a backup node. And, finally for the cross connected case, the backup and primary relation is given by: $B(N_1)=N_2$, $B(N_2)=N_1$, $B(N_3)=N_4$, $B(N_4)=N_3$. Note that the two-node cross connected case simply reduces to the case of: $B(N_1)=N_2$, $B(N_2)=N_1$.

5.3 Generic Solution

Assume node i has failed and all the other nodes undergo a reconfiguration as a result of this failure. Each surviving nodej will execute the following simple step after membership and quorum has been determined:

```
if(B(N₁) = Nⱼ) /* i.e. my nodeid */ {
    if (Nᵢ masters NetDisk devices) /* for CVM & NetDisk */ {
        take over these devices and issue reservations
            on the corresponding physical devices;
    }
    if (Nᵢ has primary ownership of disk groups) /* for VxVM */ {
        take ownership of these disk groups;
        issue reservations on the corresponding physical devices of the disk
        group:
    }
}
if(B(Nⱼ) = Nᵢ)Nᵢ) /* i.e. the failed node is my backup */ {
    /* I need to protect all my shared devices */
    For all NetDisk devices for which Nⱼ is the master
        issue reservations on corresponding physical devices;
    For all    disk groups for which Nⱼ is the primary owner
        issue reservations on the corresponding physical devices;
}
```

Note that "takeover these devices" implies that whatever interface NetDisk provides to takeover ownership of NetDisk devices will be used to accomplish this.

Without going into the syntactic details of how exactly a node determines what NetDisk devices are mastered by a failed node, it is sufficient to state that CCD maintains this information in its database and can be queried to obtain this information and also whether the currently reconfiguring node is the backup of the failed node.

In some distributed computer systems, information about the primary ownership of a disk group is maintained in the cdb file in the following format:

cluster.node.0.cdg: dg1 dg2 cluster.nodc.1.cdg: dg3 dg4.

It should be a simple matter to find an equivalent representation for this information to be placed in the CCD and made available to all nodes in exactly the same manner as the NetDisk device configuration. The extra representation to be added for each node is of course the backup node in the same manner as NetDisk devices. For example:

cdg: dg1, dg2: 0.1.

The primary owner of cluster disk-groups dg1 and dg2 is node 0 and its backup node is node 1.

It is also possible to either query CCD or the volume manager to find out the set of physical devices associated with a particular NetDisk virtual device or a particular disk group, respectively.

Finally, these are the steps executed when a failed node i is ready to join the cluster. Each of the other nodes j≠i execute this sequence in some as yet undetermined step k of the reconfiguration process:

```
If B(Nᵢ) = Nⱼ
    Release reservations on NetDisk devices for which
        Nᵢ is master
    Use NetDisk interface to switch NetDisk devices mastered
        on Node Nᵢ from Nᵢ to Nⱼ.
    Release reservations on disks in disk groups for which
        Nᵢ is primary owner.
    Deport the disk groups owned by Nᵢ.
Fi
If B(Nⱼ) = Nᵢ /* node that is joining is mv backup */
```

-continued

```
Release reservations on all NetDisk devices mastered
    on Nⱼ.
Release reservations on all devices in disk groups whose
    primary owner is Nⱼ.
Fi
```

The following sequence is executed by the joining Node $N_i$, in step k+1 of the reconfiguration process:

Master NetDisk devices mastered on Node $N_i$.

Import disk groups for which $N_i$ is primary owner.

For a node j≠i, it may not be possible to figure out from the membership whether i is joining the cluster or just undergoing a reconfiguration and was already part of the cluster. This does not matter as it is a simple matter to figure out whether node $N_j$ owns resources whose primary owners are part of the cluster membership and have it undertake the appropriate actions. If the algorithms are implemented correctly, at no point in time should node $N_j$ own resources belonging to node $N_i$ if $N_i$ was already part of the cluster. This is a safe assumption required for correctness and integrity. This algorithm is slightly expensive in terms of reconfiguration times, but in no way it constitutes a bottleneck.

We can utilize the approach of this section to solve the general resource migration problem in certain distributed computer systems. Resources that need to be highly available, are migrated over to a surviving node from a failed one. Examples of such resources are disk groups in a shared nothing database environment, disk groups for HA-NFS file-systems and, logical IP addresses. Arbitrary resources can be designated in the CCD with a master and a backup node. For example, the logical IP addresses can be migrated from failed nodes to surviving ones. Note that for a switch-over to take place, the backup node would have to release the resources of the joining node one step before the joining node takes over its resources.

5.4 A Restriction on Disk Groups

For some distributed computer systems, it is not possible to have arbitrary connections to the arrays from the nodes of the cluster. This is because, a disk group that is scattered across several arrays cannot be migrated to different nodes of the cluster, but needs to be migrated in its entirety to a single node. To illustrate, consider a configuration in which there are four nodes, $N_1, \ldots N_4$, and four array devices.

$D_1, \ldots, D_4$. Assume that node $N_i$ has a physical connection to array $D_i$. In addition, $N_2$ is physically connected to $D_1$ and $D_3$ and $N_3$ is physically connected to $D_2$ and $D_4$. Finally, assume that $N_1$ and $N_4$ have no further connections.

Let's say the node $N_2$ has a disk group G whose devices are scattered on disks in arrays $D_1$ and $D_3$. If $N_2$ now fails, G cannot be imported in its entirety on either $N_1$ or $N_3$ since all of its disks won't be visible on either $N_1$ or $N_3$. Such configurations are not supported in some distributed computer systems. If a node owns a disk group and if the node fails, it should be possible for the disk group in its entirety to be taken over by one of the surviving nodes. This does not constrain the array topology, but places restraints on how data is scattered across the arrays.

5.5 A Migration Strategy with Minimal Effort

One of the more time consuming activities in a system is laying out of the data. We propose to minimize this for the those who wish to upgrade their existing two node clusters to three nodes, or those with a three node cluster that wish to update their clusters to four nodes. We are not going to do this dynamically. The cluster will be shut down and restarted. The only criteria is to allow access to the mirror and the primary copy of the data from the same node without having to relay all the volumes and/or disk groups. This may require addition of adaptor cards.

The above description is illustrative only and is not limiting. The present invention is therefore defined solely and completely by the appended claims together with their full scope of equivalents.

What is claimed is:

1. A method for determining membership of nodes in a distributed computer system, the method comprising:

determining with which connected ones of other nodes of the distributed computer system a selected node is in communication;

broadcasting to the other nodes data specifying the connected nodes;

receiving connection data from the connected nodes;

applying optimization criteria to the connection data to form a proposed membership list of a proposed new cluster;

broadcasting the proposed membership list to the connected nodes;

receiving other proposed membership lists from the connected nodes; and selecting an elected proposed membership list from the other proposed membership lists.

* * * * *